June 25, 1940.    W. G. WEHR    2,205,550
MATERIAL HANDLING APPARATUS
Filed July 1, 1938    2 Sheets-Sheet 1
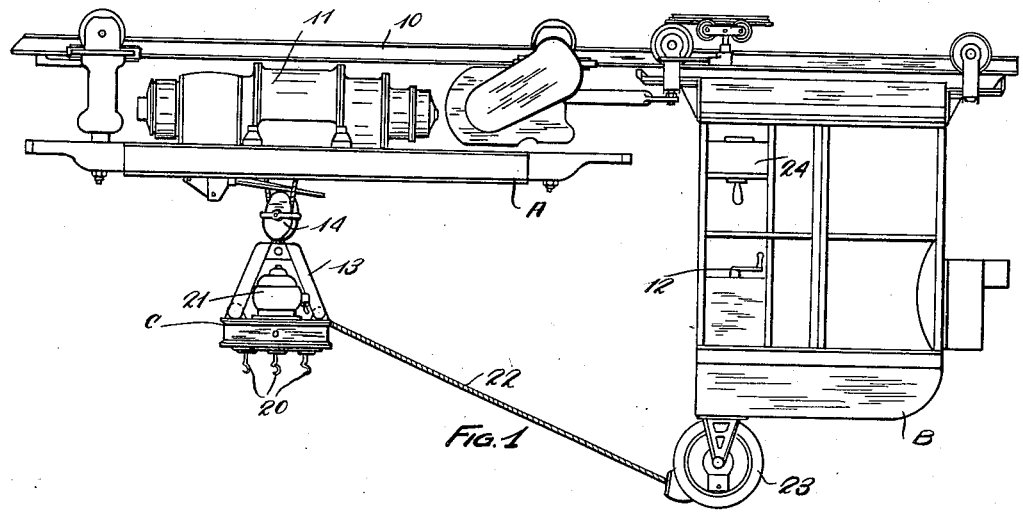
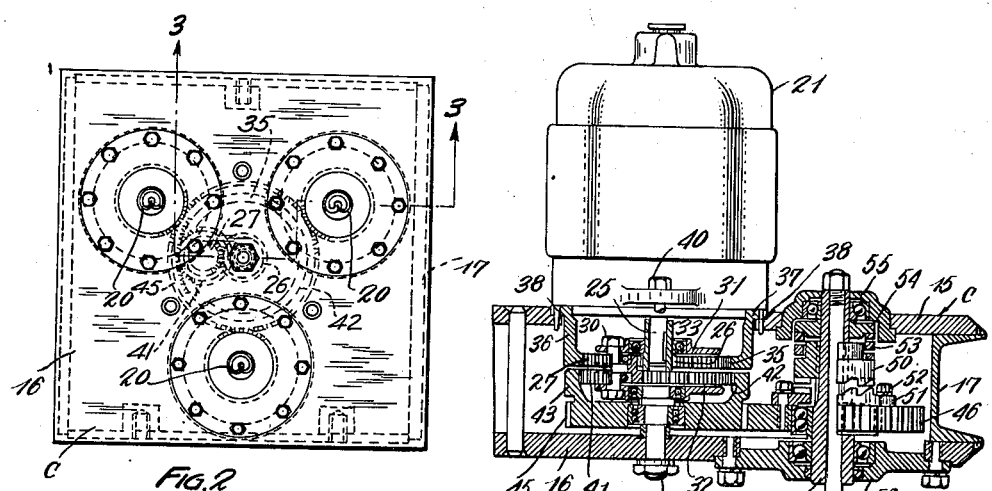
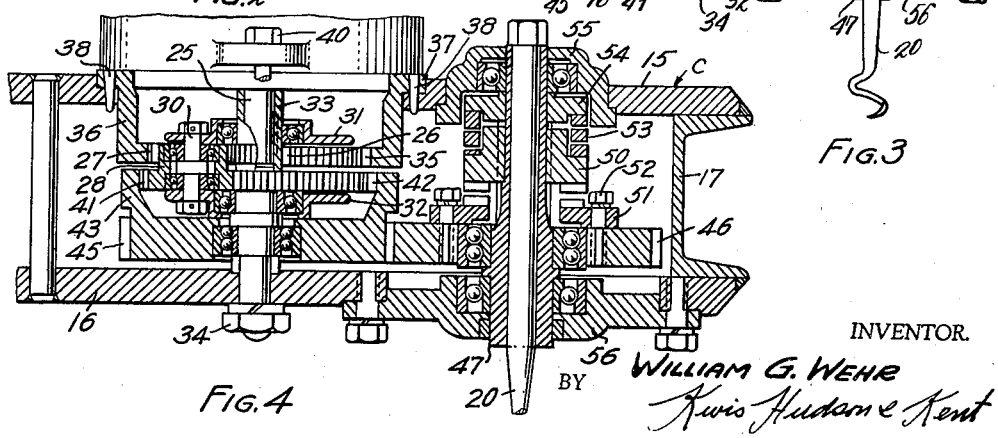
INVENTOR.
WILLIAM G. WEHR
BY
ATTORNEYS Patented June 25, 1940

2,205,550

UNITED STATES PATENT OFFICE 2,205,550

MATERIAL HANDLING APPARATUS

William G. Wehr, East Cleveland, Ohio, assignor to The Cleveland Crane & Engineering Company, Wickliffe, Ohio, a corporation of Ohio Application July 1, 1938, Serial No. 216,977

1 Claim. (Cl. 212—126)

The present invention relates to material handling equipment and more particularly to a grab especially adapted to handle material, such as pulp, paper, straw, cotton, etc., in bale form.

An object of the present invention is the provision of a novel apparatus for handling bales of material, such as pulp, paper, straw, etc., without engaging either the sides or the ends of the bales, so that when the bales are being stored or the like they can be placed tightly together thus conserving space and producing a stable pile, that is, a pile that will not easily topple over.

Another object of the present invention is the provision of a novel apparatus particularly adapted for handling material in bale form comprising a plurality of motor-driven downwardly projecting spiral tines or screws adapted to engage in the material, which grab is simple in construction and reliable in operation.

Another object of the invention is the provision of a novel carrier for an overhead tramrail system comprising hoist mechanism, a control cab, a grab suspended from the hoist mechanism and including a plurality of downwardly projecting spiral tines or screws, a reversible electric motor for rotating the tines, and control mechanism for the motor located in the cab.

The present invention resides in certain novel details of construction and combinations and arrangements of parts, and further objects and advantages thereof will be apparent to those skilled in the art to which the invention relates from the following description of the preferred embodiments thereof described with reference to the accompanying drawings, in which similar reference characters designate corresponding parts throughout the several views and in which:

Fig. 1 is a side elevation of an overhead monorail carrier embodying the present invention;

Fig. 2 is a bottom view of the grab shown in Fig. 1;

Fig. 3 is a section on the line 3—3 of Fig. 2 with portions in elevation;

Fig. 4 is an enlarged section on the line 3—3 of Fig. 2 of a portion of the mechanism shown in Fig. 3;

Figure 5:
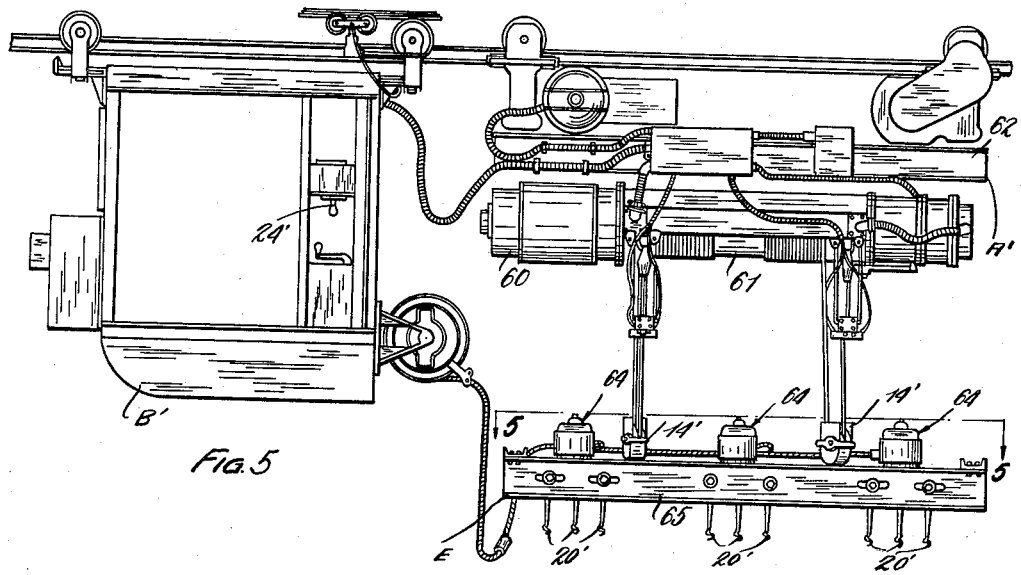
Fig. 5 is a view similar to Fig. 1 but showing a different type of carrier and a grab of modified construction.

While the present invention is susceptible of various modifications and alternative constructions, it is herein illustrated and described as embodied in or applied to a carrier for an overhead tramrail system. However, it is to be understood that the grab of the present invention may be used with material handling equipment other than overhead tramrail systems, such as various types of cranes, etc.

The overhead tramrail system shown, in which the preferred embodiments of the invention are incorporated, is for the most part commercially known in the art, and only those parts thereof which are necessary to a complete understanding of the present invention are illustrated in the drawings and herein described in detail.

Referring to Figs. 1, 2, 3, and 4 of the drawings, the reference character A designates a commercially known electrically propelled open cab type of carrier adapted to travel along the overhead monorail 10 forming a part of an electrified overhead tramrail system, under the control of an operator seated in the control cab B. The carrier shown including the control cab is a commercially known carrier and will not be described in detail.

The carrier A includes an electric hoist 11 adapted to be controlled by a manually operable controller 12 located in the cab B. The grab proper comprising a frame designated generally by the reference character C is suspended from the hoist mechanism 11 through the medium of a bracket 13 and a block 14. The block 14 is connected to the bracket in any convenient manner and the bracket 13 is bolted to lugs welded to the upper side of the frame C. The frame C comprises upper and lower plates 15 and 16, respectively, held together and in spaced relation by channel members 17 interposed therebetween and welded thereto along the edges. Projecting downwardly from the frame C are three spiral tines 20 rotatably supported in the frame in a manner hereinafter specifically referred to and operatively connected to a reversible electric motor 21 fixed to the upper plate 15 of the frame C. The electric motor 21 is adapted to be controlled from the cab B through the medium of a flexible cable 22 adapted to be wound and unwound from the reel 23 of conventional construction fixed to the underside of the cab B and a controller 24 located at a convenient place in the cab.

The armature of the motor 21 is adapted to rotate about a vertical axis and the lower end of the armature shaft 25 which projects into the frame C has a gear 26 keyed thereto, which gear is continuously in mesh with the upper gear 27 of a gear cluster 28 forming part of a planetary type speed reducing mechanism. The gear cluster 28 is rotatably supported on a stub shaft 30 fixed in upper and lower disk-like members 31 and 32, respectively. The upper disk member 31 is rotatably supported on the hub 33 of the gear 26 and the lower disk member 32 is rotatably supported on the upper end of a shaft 34 fixed in the lower plate 16 coaxially with the armature shaft 25 of the motor 21. The upper gear 27 of the gear cluster 28 is continuously in mesh with an internal gear 35 formed on the lower end of a sleeve member 36 the upper end of which is provided with a flange 37 interposed between the housing of the motor 21 and the upper plate 15 of the frame C. Dowel pins 38 prevent relative rotation between the frame C, the member 36 and the housing for the motor 21. The motor 21 is bolted to the upper plate 15 of the frame by means of bolts 40 on either side thereof. The gear cluster 28 comprises a lower gear 41 slightly larger in diameter than the gear 27, continuously in mesh with an internal gear 42 formed on an upwardly extending flange 43 of a centrally located driving gear 45. The driving gear 45 is rotatably supported for rotation about the shaft 34 below the disk member 32.

As shown, the grab comprises three spiral tines 20 located equidistant from the axis of rotation of the driving gear 45 and operatively connected thereto through the medium of driven gears 46 rotatably supported about sleeve members 47 within which the tines proper are fixed. The driven gears 46 are operatively connected to the tines 20 through the medium of one-way overload automatic release clutches, and since this construction is the same in each instance only one thereof is shown in detail in the drawings, see Figs. 3 and 4. The manner of supporting the tines and the driven gear in the frame C is the same in each instance, and this construction will be described with reference to the same figure.

As shown, the clutches employed for connecting the gears 46 to the tines about which they are rotatably supported are of the spring-loaded saw tooth type, the upper and lower elements 50 and 51 of which surround the sleeve member 47 within which the tine or screw 20 is detachably fixed. The lower element 51 of the clutch is bolted to the upper side of the gear 46 and the upper element 50 is slidably keyed to the sleeve member 47. The upper element 50 is continuously urged in a downwardly direction to engage the teeth of the clutch elements by a heavy compression spring 53 positioned between the clutch element and a collar 54 fixed to the upper end of the sleeve member 47. The sleeve member 47 is rotatably supported in upper and lower members 55 and 56, respectively, detachably supported in suitable apertures in the upper and lower plates 15 and 16, respectively. The lower aperture is larger than the driven gear 46 and the construction is such that the tine or screw assemblies can be removed and replaced as units.

The construction of the clutches is such that in the event that one of the tines or screws goes ahead of the others in entering the material to be handled or meets an obstruction which would be liable to break it, the clutch will slip. In the reverse direction, that is when the motor is operated to rotate the tines in a direction to release them from the load, the drive is positive. While the foregoing construction is preferred it is to be understood that the gears 46 may be directly connected to or fixed to the sleeve members 47, or clutches which slip at or upon reaching predetermined loads in both directions may be employed for those shown which slip only in one direction. In some instances one or the other of these constructions may be preferred to that shown.

Fig. 5 shows a carrier A' for an overhead tramrail system similar to the carrier shown in Fig. 1 except that the hoist motors 60 and the cable drum 61 are located beneath the carrier frame 62 instead of above it, and the grab, designated as E, is adapted to handle a plurality of bales at one time whereas the grab shown in Fig. 1 is adapted to handle but one bale at a time.

Figure 6:
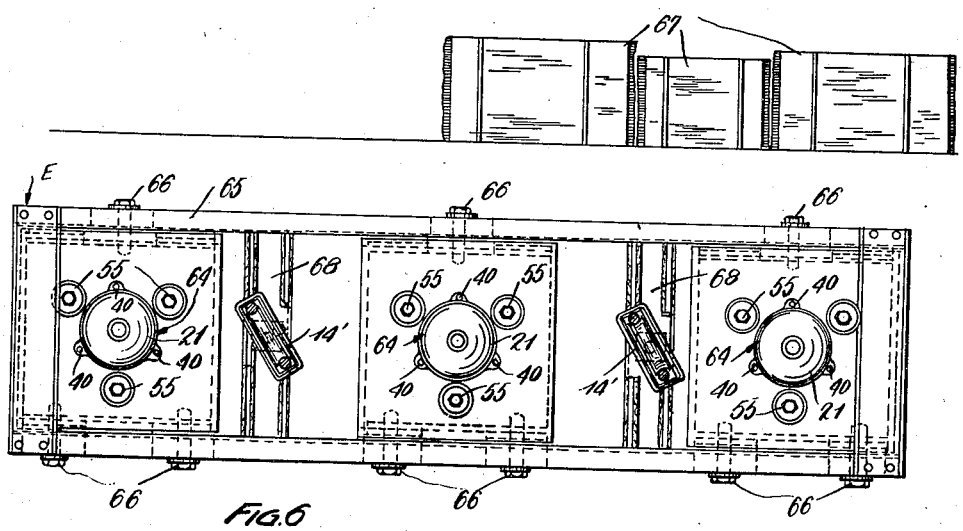
Fig. 6 is a view approximately on the line 6—6 of Fig. 5.

The grab shown in Figs. 5 and 6 comprises three units 64 each of which is similar to the grab shown in Figs. 1, 2, 3, and 4. The units 64 are carried in a frame 65 by bolts 66. The bolts which support the end units extend through slots in the frame 65, which construction permits adjustment thereof toward or from the center unit to accommodate bales of different size. The units are simultaneously controlled from a controller 24' located in the control cab B'. Three bales of material 67 are shown in Fig. 5 underneath the grab to illustrate the manner in which the end units are adjusted, so that the spiral tines or screws 20' will enter the bales about the center thereof. In the present instance the hoist drum has two cables thereon and the blocks 14' are connected to cross members 68 of the frame 65.

It is believed that the operation of the device will be apparent to those skilled in the art to which it relates from the foregoing description of the preferred embodiments of the invention. While the embodiments of the invention shown have been illustrated and described in considerable detail, it is to be understood that the invention may be otherwise embodied and is not limited to the particular construction shown and described. While the tines or screws shown closely resemble a conventional corkscrew in construction, it will be apparent that they may be otherwise constructed.

It is the intention to cover hereby all modifications, adaptations and variations of the constructions described herein that come within the practice of those skilled in the art to which the invention relates and which fall within the spirit and scope of the appended claim.

Having described my invention I claim:

A grab of the character referred to for handling material in bale form and comprising a frame adapted to be suspended from an overhead support, a reversible electric motor carried by said frame with the rotatable member thereof positioned vertically, a driving gear rotatably supported coaxially with said rotatable member of said motor, planetary speed reducing gearing between the rotatable element of said motor and said driving gear, a plurality of downwardly projecting spiral tines adapted to engage in material in bale form, means for rotatably supporting said tines in said frame equidistant from the axis of rotation of said driving gear, and driven gears operatively connected to said tines and in mesh with said driving gear.

WILLIAM G. WEHR.